US005479012A

United States Patent [19]

Wells

[11] Patent Number: 5,479,012

[45] Date of Patent: Dec. 26, 1995

[54] METHOD OF SPACE CHARGE CONTROL IN AN ION TRAP MASS SPECTROMETER

[75] Inventor: Gregory J. Wells, Fairfield, Calif.

[73] Assignee: Varian Associates, Inc., Palo Alto, Calif.

[21] Appl. No.: 178,694

[22] Filed: Jan. 10, 1994

Related U.S. Application Data

[63] Continuation-in-part of Ser. No. 68,483, May 28, 1993, abandoned, and Ser. No. 43,240, Apr. 6, 1993, Pat. No. 5,381,006, which is a continuation-in-part of Ser. No. 980,991, May 29, 1992, Pat. No. 5,265,483.

[51] Int. Cl.[6] .......... B01D 59/44; H01J 49/00

[52] U.S. Cl. .......... 250/282; 250/292

[58] Field of Search .......... 250/281, 282, 250/292

[56] References Cited

U.S. PATENT DOCUMENTS

| | | | |
|---|---|---|---|
| 4,540,884 | 9/1985 | Stafford et al. | 250/292 |
| 4,650,999 | 3/1987 | Fies et al. | 250/292 |
| 4,749,860 | 6/1988 | Kelley | 250/292 |
| 4,818,869 | 4/1989 | Weber-Grabau | 250/292 |
| 5,107,109 | 4/1992 | Stafford et al. | 250/292 |
| 5,198,665 | 3/1993 | Wells | 250/292 |
| 5,200,613 | 4/1993 | Kelley | 250/292 |
| 5,206,507 | 4/1993 | Kelley | 250/292 |
| 5,324,939 | 6/1994 | Louris et al. | 250/292 |

*Primary Examiner*—Bruce C. Anderson
*Attorney, Agent, or Firm*—David Schnapf

[57] ABSTRACT

A method of using a quadrupole ion trap mass spectrometer for high resolution mass spectroscopy is disclose. In the preferred embodiment, the space charge in the ion trap is controlled with high accuracy. The mass spectrum to be analyzed is divided into a plurality of contiguous mass segments and each of the segments is separately scanned. To control space charge, a broadband supplemental waveform is applied to the ion trap during the ionization period for each segment, the broadband signal being construct to eliminate all unwanted ions from the ion trap by resonance ejection such that only those ions having masses within the desired mass segment remain in the ion trap. Preferably, the ionization of each mass segment is performed under identical trapping conditions, and the ionization parameters for each segment is adjusted to optimize the space charge in the trap for that particular segment. Conveniently, the adjustment of ionization parameters may be based on the previous analytical scan of the same mass segment.

18 Claims, 3 Drawing Sheets

METHOD OF SPACE CHARGE CONTROL IN AN ION TRAP MASS SPECTROMETER

RELATED CASES

This case is a continuation-in-part of Ser. No. 08/043,240, filed Apr. 6, 1993, now U.S. Pat. No. 5,381,006, which was a continuation-in-part of Ser. No. 07/980,991, filed May 29, 1992, now U.S. Pat. No. 5,265,483. This case is also a continuation-in-part of Ser. No. 08/068,483, filed May 28, 1993, now abandoned.

FIELD OF THE INVENTION

The present invention relates to the field of mass spectrometry, and is particularly related to methods for controlling space charge effects in a three-dimensional quadrupole ion trap mass spectrometer.

BACKGROUND OF THE INVENTION

The present invention relates to methods of using the three-dimensional quadrupole ion trap mass spectrometer ("ion trap") which was initially patented in 1960 by Paul, et al., (U.S. Pat. No. 2,939,952). In recent years use of the ion trap mass spectrometer has grown dramatically, in part due to its relatively low cost, ease of manufacture, and its unique ability to store ions over a large range of masses for relatively long periods of time.

The quadrupole ion trap comprises a ring-shaped electrode and two end cap electrodes. Ideally, both the ring electrode and the end cap electrodes have hyperbolic surfaces that are coaxially aligned and symmetrically spaced. By placing a combination of AC and DC voltages (conventionally designated "V" and "U", respectively) on these electrodes, a quadrupole trapping field is created. A trapping field may be simply created by applying a fixed frequency (conventionally designated "f") AC voltage between the ring electrode and the end caps to create a quadrupole trapping field. The use of an additional DC voltage is optional, and in commercial embodiments of the ion trap no DC voltage is normally used. It is well known that by using an AC voltage of proper frequency and amplitude, a wide range of masses can be simultaneously trapped.

The mathematics of the quadrupole trapping field created by the ion trap are well known and were described in the original Paul, et al., patent. For a trap having a ring electrode of a given equatorial radius $r_0$, with end cap electrodes displaced from the origin at the center of the trap along the axial line r=0 by a distance $z_0$, and for given values of U, V and f, whether an ion of mass-to-charge ratio (m/e, also frequently designated m/z) will be trapped depends on the solution to the following two equations:

$$a_z = \frac{-16eU}{m(r_0^2 + 2z_0^2)\omega^2} \quad \text{Eq. 1}$$

$$q_z = \frac{+8eV}{m(r_0^2 + 2z_0^2)\omega^2} \quad \text{Eq. 2}$$

where $\omega$ is equal to $2\pi f$.

Solving these equations yields values of $a_z$ and $q_z$ for a given ion species having the selected m/e. If the point ($a_z$, $q_z$) maps inside the stability envelop, the ion will be trapped by the quadrupole field. If the point ($a_z$, $q_z$) falls outside the stability envelop, the ion will not be trapped and any such ions that are introduced within the ion trap will quickly move out of the trap. By changing the values of U, V or f one can affect the stability of a particular ion species. Note that from Eq. 1, when U=0, (i.e., when no DC voltage is applied to the trap), $a_z$=0.

(It is common in the field to speak in abbreviated fashion in terms of the "mass" of ions, although it would be more precise to speak of the mass-to-charge ratio of ions, since that is what really affects the behavior of an ion in a trapping field. For convenience, this specification adopts the common practice, and generally uses the term "mass" as shorthand to mean mass-to-charge ratio.)

The typical method of using an ion trap consists of applying voltages to the trap electrodes to establish a trapping field which will retain ions over a wide mass range, introducing a sample into the ion trap, ionizing the sample, and then scanning the contents of the trap so that the ions stored in the trap are ejected and detected in order of increasing mass. Typically, ions are ejected through perforations in one of the end cap electrodes and are detected with an electron multiplier.

A number of methods exist for ionizing sample molecules. Most commonly, sample molecules are introduced into the trap and an electron beam is turned on, ionizing the sample within the trap volume. This is referred to as electron impact ionization or "EI". Alternatively, ions of a reagent compound can be created within or introduced into the ion trap to cause ionization of the sample due to interactions between the reagent ions and sample molecules. This technique is referred to as chemical ionization or "CI". Other methods of ionizing the sample, such as photoionization using a laser beam or other light source, are also known. For purposes of the present invention the specific ionization technique used to create ions is generally not important.

The various known ionization techniques all involve what will be referred to as "ionization parameters" that effect the number of ions created or introduced into the ion trap. In turn, the number of ions stored within the trap volume determines the space charge within the trap, since the space charge in the trap is a function of the overall ion population. Various ionization parameters may be used to control the number of ions introduced in the trap depending on the specific method of ion introduction. For example, when using El, the number of ions created in the trap is a function of the intensity of the electron beam used to create the ions as well as the length of time the beam is turned on. Thus, both of these are ionization parameters as that term is used in the present specification, since the ion population in the trap can be controlled by varying the intensity of the beam or by varying the length of time the beam is turned on. Likewise, when using photoionization, both the length of time the light beam is turned on and the intensity of the beam are considered ionization parameters.

When using CI, the reaction time between the sample molecules and the reagent ions is an ionization parameter. It is noted that reagent ions are normally created within the ion trap by ionizing reagent molecules using an electron beam. In other words, the reagent ions are normally created by EI. In such a situation, the quantity of reagent ions created in the ion trap is dependent on the same ionization parameters described above, i.e., the length of time the electron beam is turned on and the intensity of the beam. When ionizing reagent ions, measures are normally taken to eliminate any sample ions simultaneously formed in the ion trap. According to the present invention, another method of creating reagent ions for a CI experiment is to allow initial precursor ions to react with a reagent gas to form the desired reagent ions. Thus, the reagent ions are themselves formed by chemical ionization.

While in most instances sample ions are created within the trap volume, in some instances ions may be created externally by any of the foregoing methods and transported into the ion trap using known ion transport means. In such instances, an electronic gating arrangement may be used to control the flow of ions into the trap, and the length of time the ion gate is "open" can be used to control the ion population introduced into the ion trap. Thus, this would also be considered an ionization parameter according to the present invention.

As described, there are a number of known methods for creating the ions that are trapped in an ion trap. For purposes of this specification, the terms "introduced" and "introducing," when used in connection with sample ions, are intended to cover all of the various methods. Thus, ions may be introduced into the ion trap either by formation within the trap volume, as by traditional in trap I or CI techniques, or by formation outside of the ion trap and transport into the trap volume.

Once ions are introduced into the trap it is generally the object of the spectroscopist to obtain a mass spectrum of the contents of the ion trap, i.e., to determine the mass number and relative abundance of the trapped ions. While some types of experiments require further manipulations of the ion trap prior to obtaining a mass spectrum, such as isolating a "parent" ion and performing an MS/MS experiment, commercial ion traps are most commonly used to obtain mass spectra.

Obtaining a mass spectrum generally involves scanning the trap so that ions are removed from the ion trap and detected. U.S. Pat. No. 4,540,884 to Stafford, et al., describes a technique for scanning one or more of the basic trapping parameters of the quadrupole trapping field, i.e., U, V or f, to sequentially cause trapped ions to become unstable and leave the trap. Unstable ions tend to leave in the axial direction and can be detected using a number of techniques, for example, as mentioned above, a electron multiplier or Faraday collector connected to standard electronic amplifier circuitry.

In the preferred method taught by the '884 patent, the DC voltage, U, is set at 0. As noted, from Eq. 1 when U=0, then $a_z$=0 for all mass values. As can be seen from Eq. 2, the value of $q_z$ is directly proportional to V and inversely proportional to the mass of the particle. Likewise, the higher the value of V the higher the value of $q_z$. In the preferred embodiment the scanning technique of the '884 patent is implemented by ramping the value of V. As V is increased positively, the value of $q_z$ for a particular mass increases to the point where it passes from a region of stability to one of instability. Consequently, the trajectories of ions of increasing mass to charge ratio become unstable sequentially, and are detected when they exit the ion trap. This technique will be referred to as mass instability scanning.

According to another known method of scanning the contents of an ion trap, a supplemental AC voltage is applied across the end caps of the trap to create an oscillating dipole field supplemental to the quadrupole field. (Sometimes the combination of a quadrupole trapping field and a supplemental rf dipole field is referred to as a "combined field.") In this method, the supplemental AC voltage has a different frequency than the primary AC voltage V. The supplemental AC voltage can cause trapped ions of specific mass to resonate at their so-called "secular" frequency in the axial direction. When the secular frequency of an ion equals the frequency of the supplemental voltage, energy is efficiently absorbed by the ion. When enough energy is coupled into the ions of a specific mass in this manner, they are ejected from the trap in the axial direction and where they can be detected as has been described. The technique of using a supplemental dipole field to excite specific ion masses is sometimes called axial modulation. As is well known in the art, axial modulation is also frequently used to eject unwanted ions from the trap, and in connection with MS/MS experiments to cause parent ions in the trap to collide with molecules of a background buffer gas and fragment into daughter ions. This latter technique is commonly referred to as collision induced dissociation (CID). As is also well known, whether an ion will be ejected by axial modulation from the trap, or instead merely fragmented, is largely dependent on the voltage level of the supplemental dipole voltage.

The secular frequency of an ion of a particular mass in an ion trap depends on the magnitude of the fundamental trapping voltage V. Thus, there are two ways of bringing ions of differing masses into resonance with the supplemental AC voltage: scanning the frequency of the supplemental voltage in a fixed trapping field, or varying the magnitude V of the trapping field while holding the frequency of the supplemental voltage constant. Typically, when using axial modulation to scan the contents of an ion trap, the frequency of the supplemental AC voltage is held constant and V is ramped so that ions of successively higher mass are brought into resonance and ejected. The advantage of ramping the value of V is that it is relatively simple to perform and provides better linearity than can be attained by changing the frequency of the supplemental voltage. The method of scanning the trap by using a supplemental voltage will be referred to as resonance ejection scanning.

Resonance ejection scanning of trapped ions provides better sensitivity than can be attained using the mass instability technique taught by the '884 patent and produces narrower, better defined peaks. In other words, this technique produces better overall mass resolution. Resonance ejection scanning also substantially increases the ability to analyze ions over a greater mass range.

In commercial embodiments of the ion trap using resonance ejection as a scanning technique, the frequency of the supplemental AC voltage is set at approximately one half of the frequency of the AC trapping voltage. It can be shown that the relationship of the frequency of the trapping voltage and the supplemental voltage determines the value of $q_z$ (as defined in Eq. 2 above) of ions that are at resonance. Indeed, sometimes the supplemental voltage is characterized in terms of the value of $q_z$ at which it operates.

While the most common method of analyzing the contents of an ion trap involves causing ions to sequentially leave the trap in the axial direction where they can be intercepted by an external detector, other detection methods, including in-trap detection methods are well known and may be used in connection with the present invention. Some of these techniques are described below.

Commercially, most ion traps are sold in connection with gas chromatographs (GC's). As is well known, a GC serves to separate a complex sample into its constituent compounds thereby facilitating the interpretation of mass spectra. Of course, ion trap technology is not limited to use with GC's, and other sample input sources are known. For example, with an appropriate interface, a liquid chromatograph (LC) can be used as a sample source. Of course, for some applications no sample separation is required, and sample may be introduced directly into the ion trap.

The flow from a GC is continuous, and a modern high resolution GC produces narrow peaks, sometimes lasting only a matter of seconds. In order to obtain a mass spectra of narrow peaks, it is necessary to perform at least one complete scan of the ion trap per second. The need to perform rapid scanning of the trap adds constraints which may also affect mass resolution and reproducibility. Similar constraints exist when using the ion trap with an LC or other continuously flowing, variable sample stream.

As with most any instrument of its type, it is known that the dynamic range of an ion trap is limited, and that the most accurate and useful results are attained when the trap is filled with the optimal number of ions. Ion trap mass spectrometers are extremely susceptible to deleterious effects of space charge and ion molecule reactions. The space charge in the ion trap alters the overall trapping field interfering with mass resolution and calibration. Moreover, space charge affects the trapping efficiency and ion molecular reactions. If too few ions are present in the trap, sensitivity is low and peaks may be overwhelmed by noise. If too many ions are present in the trap, space charge effects can significantly distort the trapping field, and peak resolution can suffer.

The prior art has addressed this problem by using a so-called automatic gain control (AGC) technique which aims to keep the total charge in the trap at a constant level. In particular, prior art AGC techniques use a fast "prescan" of the trap to estimate the charge present in the trap, and then uses this prescan to control a subsequent analytical scan. While this approach has been acceptable for many applications and experiments, the inventor has determined that it does not provide highly accurate control over the space charge in the ion trap and, thus, limits the ability to obtain very high resolution.

There are several prior art AGC methods that have been used to control the space charge levels in ion traps so as to optimize the performance of the trap for various applications. These prior art methods all have in common a two-step process of conducting each sample analysis: performing a prescan to estimate the concentration of sample ions present in the trap using fixed, predetermined ionization parameters, followed by an analytical scan of the trap performed using optimized the ionization parameters, based on information obtained from the prescan. The goal of these techniques is to always store approximately the same total number of ions in the trap as the sample levels change. As used herein the term prescan refers to a scan of the contents of the trap which is performed for the purpose of optimizing an ionization parameter. In a prescan, no mass spectrum for use by the spectroscopist is created. A prescan is normally performed so rapidly that meaningful mass spectral data would not be discernable due to the very poor mass resolution associated with rapid scanning. The lack of mass data is not important for a prescan since the purpose of a prescan is simply to measure the amount of charge in the ion trap. Likewise, as used herein the term analytical scan refers to a scan intended to collect mass spectral data of the contents of the ion trap.

In the prior art method of Stafford, et al., (U.S. Pat. No. 5,107,109) the sample concentration in the trap is measured in a prescan by applying a short, fixed-duration electron beam to the trap to cause sample ionization, followed by a rapid measurement of the total ion content (TIC) of the trap. This measurement is used to control the number of sample ions in the ion trap during the subsequent analytical scan. There is no teaching to rid the trap of any unwanted ions during either the prescan or the subsequent analytical scan.

In the prior art method of Weber-Grabau, et al., (U.S. Pat. No. 4,771,172) a fixed-duration prescan is again used, in a manner similar to the method of the '109 patent in conjunction with chemical ionization to measure the sample concentration in the trap prior to the analytical scan. This patent also teaches eliminating unwanted sample ions from the trap during the period in which reagent ions are created in the trap. As in the '109 patent, during the prescan both the length of time that the electron beam is turned on to ionize the reagent ions, as well as the length of time the reagent ions are allowed to react with the sample to ionize it, are fixed.

The prior art method of Kelley (U.S. Pat. No. 5,200,613) also discloses a prescan which uses a short, fixed ionization time as in the method of the '109 patent, with the improvement being the additional step of applying notched-filtered noise to the trap to resonantly eject undesired ions. The ion ejection, by means of filtered noise, to isolate parent ions, is performed in connection with both the prescan and the analytical scan. Kelley also teaches use of this process with MS/MS experiments.

All of these prior art methods suffer from utilizing fixed, predetermined ionization parameters during the prescan step to estimate the sample concentration in the trap and to adjust an ionization parameter during the subsequent analytical scan. However, a variety of ion-molecule reactions can occur within the ion trap which alter the relative ion intensity of sample molecules as described below.

The method of the '109 patent, has the additional limitation in that the prescan measures the integrated ion signal from a broad mass range of ions that are trapped during the ionization period of the prescan. In a complex matrix eluting from a GC the ratio of sample to matrix can change dramatically during the elution of a sample peak from the chromatograph. As will be understood by those skilled in the art, the term "matrix" refers to the entire mixture of compounds that is introduced into the ion trap at any given time and includes molecules different from the sample compound(s) of interest. Such background molecules may be present for a variety of reasons. Thus, fixed ionization conditions during the prescan may increase the error in the sample level determination by including undesired ions from the matrix. Ionization of the matrix will often produce large numbers of ions with masses below that of the parent ion. Low mass ions in particular are troublesome in an ion trap, because they decrease the trapping efficiency of the higher mass parent ions. When very high concentration levels of the matrix are present, use of a fixed prescan may cause the number of sample ions that are trapped to change with the level of the matrix, even if the sample level is constant.

The method of Kelley attempts to reduce the sample/matrix problem by improving upon the method of the '109 patent, by adding the additional step of applying notched filtered noise to the trap during ionization to eject unwanted ions and to isolate a parent ion. Because of the continuous frequency distribution of noise, large power levels are required in order to have enough power at the secular frequency of all unwanted ions in order to eject them completely.

Another technique for controlling the effects of space charge in an ion trap is described in the prior art method of Fies, et al., (U.S. Pat. No. 4,650,999). As described in that patent, control of the space charge in the trap over the trapping range is controlled by using a segmented scan of the ion trap, wherein each segment traps ions within a portion of the mass range by using a different three dimensional quadrupole field. After ions are created and trapped the three dimensional trapping field for each segment is then changed, as taught by the '884 patent, so that trapped ions of consecutive masses become unstable and leave the trap for detection. As stated in the specification of the '999 patent, "Each segment will have different storage voltages and starting mass" (column 4, line 46). In simple terms, the patent teaches periodically interrupting a continuous scan of the trap to form ions for the various scan segments.

There are several significant disadvantages of the prior art method of Fies, et al. For example, it is well known that when using EI, the ionization conditions of the trap vary as a function of the trapping conditions. In effect, the trapping voltages affect the energy of the electron beam used for ionization. The method of Fies, et al., requires that each segment be ionized under different trapping conditions and, hence, the energy of the ionizing electron beam varies from one segment to the next. In addition, there can be undesired ion-molecule reactions that occur even during the time span of the ionization period.

As an example, in a class of compounds known as fatty acid methyl esters (FAME) there is an abundant ion at mass 74 which is a strong proton donor. The presence of FAME ions results in the protonation of the neutral FAME sample molecules (molecular mass =M), with the subsequent formation of the protonated molecular ion of mass equal to M+1. The resulting abnormally high value for the M+1 ion intensity is an undesired result of the ion-molecule reactions that take place during the ionization period and subsequent times prior to the mass 74 ion being scanned out from the trap. The prior art method of Fies makes no provision for eliminating the unwanted ion-molecule reactions that occur during the ionization period.

The method of Fies also does not provide a means of eliminating unwanted masses above the mass range of the particular mass segment that is being scanned; for a particular mass segment, only the space charge from those low mass ions that were scanned out of the trap during the previous segment is removed. A further limitation is the limited range over which the trapping voltage can be adjusted during the ionization period without affecting the trapping efficiency.

The prior art method of Kelley eliminates unwanted ions above and below a selected mass range by using a notched filtered noise signal to resonate the unwanted ions out of the trap. In addition, Kelley teaches use of a prescan to optimize the ionization parameters for an analytical scan. Since the prescan "integrates" the ions in the prescan range it can only be used to optimize the following analytical scan in an "average, integrated" manner. An additional limitation of the use of fixed prescans is the additional time required to perform the ionization and ejection/detection step during the prescan.

A final, and significant limitation of the prior art methods of sampling and controlling the space charge in the trap, relates to the optimization of the detection of low intensity ions in the presence of other, larger intensity ions in the same spectrum. The fixed ionization prescan method would often be unable to detect and thus optimize low intensity ions, as the integrated prescan ion intensity would be mostly due to the intense ion and thus the optimization of the following analytical scan would be done mostly for the high intensity ion. To the extent that the technique of Fies, et al., has been combined in the prior art with the prescanning technique of the '109 patent, prescanning has not been conducted separately as to each mass segment. Rather prescanning has been used only to determine the TIC of the total mass range in the ion trap.

SUMMARY OF THE INVENTION

Accordingly, it is the object of the present invention to provide a means to simultaneously overcome the above-described limitations of the prior art.

It is another object of the present invention to provide a technique for using an ion trap to provide control of space charge in the trap to a highly constant level.

Another object of the present invention is to provide a technique for using an ion trap which allows the mass spectrum to be divided into segments but where the trapping conditions for each of the segments of the spectrum are constant.

Yet another object of the present invention is to provide a technique for using an ion trap which allows the mass spectrum to be divided into segments and where the ionization parameters used for each segment are independently controllable.

These and other objects of the present invention, which will be apparent to those of ordinary skill in the art upon reading the present specification in conjunction with the accompanying drawings and the appended claims, are realized in the present method for operating a quadrupole ion trap mass spectrometer. In a broad aspect, the present invention comprises a method of using a quadrupole ion trap mass spectrometer comprising the steps of establishing a trapping field within the ion trap such that ions in a range of interest are stably held within the ion trap, introducing sample ions into the ion trap, isolating ions within a first mass range within said ion trap, said first mass range containing fewer masses than said range of interest, detecting the masses stored within the ion trap within said first mass range, introducing sample ions into the ion trap, isolating ions within a second mass range within said ion trap, said second mass range covering a range of masses substantially different than said first mass range, and detecting the masses stored within said ion trap within said second mass range. In the preferred embodiment, the mass range of the ion trap under predetermined trapping conditions is divided into a plurality of contiguous mass segments, and the mass segments are consecutively analyzed. The masses within any given mass segment are, preferably, isolated in the trap by applying a broadband waveform to the ion trap during the ionization period. The broadband waveform is constructed to resonantly eject all unwanted ions from the ion trap. It is contemplated that more than two mass ranges or segments may be used when practicing the present invention. In the preferred embodiment, each mass range is ionized under the same trapping conditions. Likewise, in the preferred embodiment, the ionization parameters used during each mass range are independently determined; preferably, the ionization parameters for a particular mass range are determined based on the previous analytical scan of the same mass range.

DETAILED DESCRIPTION

The present invention is directed to improving the mass resolution, signal-to-noise ratio and mass calibration accuracy of commercial quadrupole ion trap mass spectrometers so that they can be used to obtain high mass resolution mass spectra over the entire useful range of the ion trap under predetermined trapping conditions. The quadrupole ion trap mass spectrometer or "ion trap" is a well-known device which is both commercially and scientifically important. The general means of operation of the ion trap has been discussed above and need not be described in further detail as it is a well-established scientific tool which has been the subject of extensive literature. The preferred embodiment of the present invention involves repetitively scanning the trap, as is common in the art.

Figure 1:
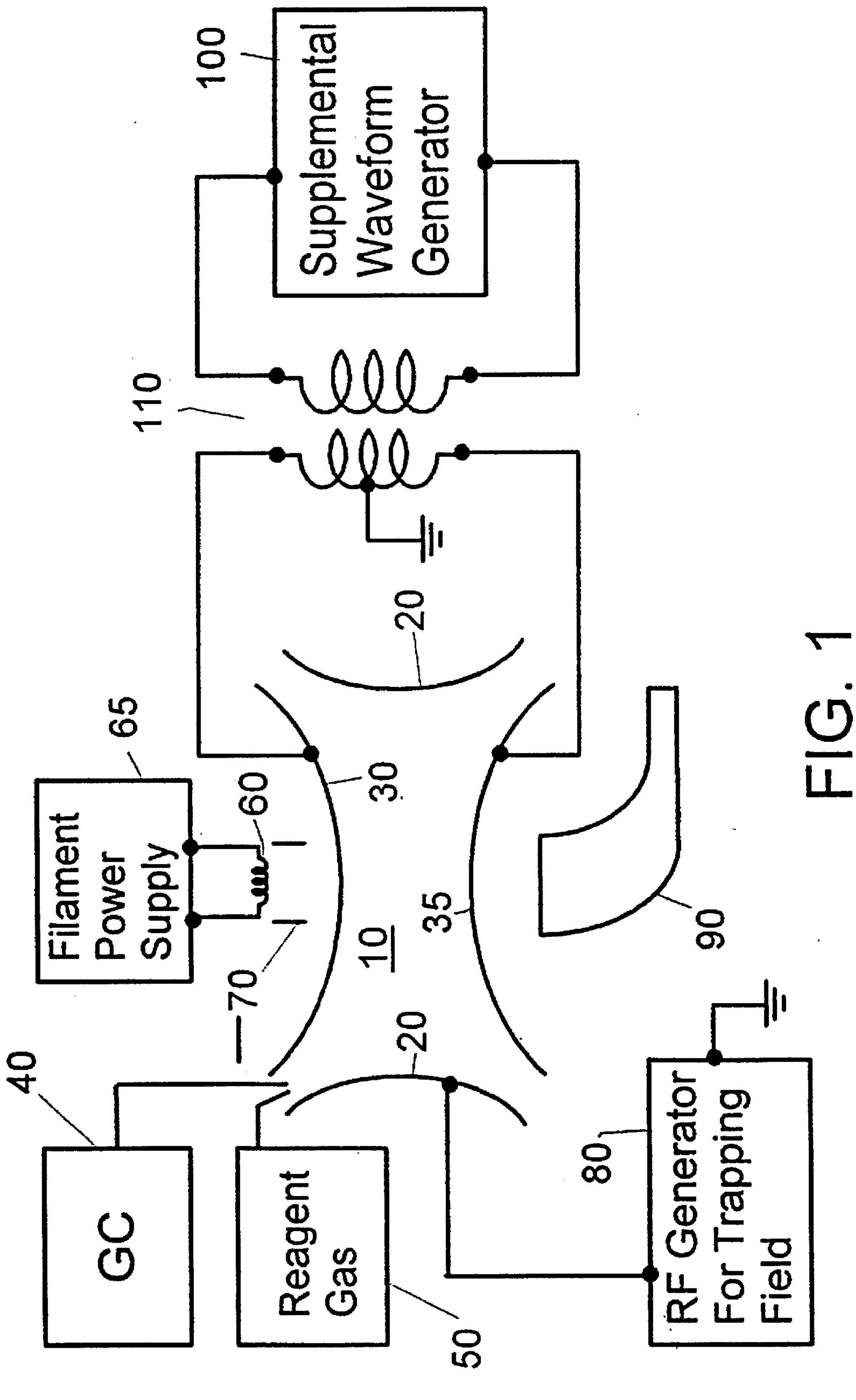
FIG. 1 is a schematic diagram of an ion trap which may be used for practicing the present invention.

Apparatus of the type which may be used in performing the method of the present invention is shown in FIG. 1, and is well known in the art. Ion trap 10, shown schematically in cross-section, comprises a ring electrode 20 coaxially aligned with upper and lower end cap electrodes 30 and 35, respectively. These electrodes define an interior trapping volume. Preferably, the trap electrodes have hyperbolic inner surfaces, although other shapes, for example, electrodes having a cross-sections forming an arc of a circle, may also be used to create trapping fields. The design and construction of ion trap mass spectrometers is well-known to those skilled in the art and need not be described in detail. A commercial model ion trap of the type described herein is sold by the assignee hereof under the model designation Saturn.

Sample, for example from a gas chromatograph 40, is introduced into the ion trap 10. Since GCs typically operate at atmospheric pressure while ion traps operate at greatly reduced pressures, pressure reducing means (e.g., a vacuum pump not shown) are required. Such pressure reducing means are conventional and well known to those skilled in the art. While the present invention is described using a GC as a sample source, the source of the sample is not considered a part of the invention and there is no intent to limit the invention to use with gas chromatographs. Other sample sources, such as, for example, liquid chromatographs with specialized interfaces, may also be used.

A source of reagent gas 50 may also be connected to the ion trap for conducting chemical ionization experiments. Sample and reagent gas that is introduced into the interior of ion trap 10 may be ionized by using a beam of electrons, such as from a thermionic filament 60 powered by filament power supply 65, and controlled by a gate electrode 70. The center of upper end cap electrode 30 is perforated (not shown) to allow the electron beam generated by filament 60 and control gate electrode 70 to enter the interior of the trap. The electron beam collides with sample and reagent molecules within the trap thereby ionizing them. Electron impact ionization of sample and reagent gases is also a well-known process that need not be described in greater detail. Of course, the method of the present invention is not limited to the use of electron beam ionization within the trap volume. Although not shown, more than one source of reagent gas may be connected to the ion trap to allow experiments using different reagent ions, or to use one reagent gas as a source of precursor ions to chemically ionize another reagent gas. In addition, a background gas may be introduced into the ion trap to dampen the oscillations of trapped ions. Such gas may also be used for CID, and preferably comprises a species, such as helium, with a high ionization potential which is above the energy of the electron beam or other ionizing source. When using an ion trap in connection with a GC, helium is preferably used as the carrier gas for the same reason.

A trapping field is created by the application of an AC voltage having a desired frequency and amplitude to stably trap ions within a desired range of masses. RF generator 80 is used to create this field, and is applied to the ring electrode. A DC voltage source (not shown) may be used to apply a DC component to the trapping field as is well known in the art.

The preferred method of scanning the trap involves use of a supplemental AC dipole voltage applied across end caps 30 and 35 of ion trap 10. Such a voltage may be created by a supplemental waveform generator 100, coupled to the end cap electrodes by transformer 110. The supplemental AC field is used to resonantly eject ions from the trap as described above. Each ion in the trap has a resonant frequency which is a function of its mass and of the trapping field parameters. When an ion is excited by a supplemental RF field at its resonant frequency it gains energy from the field and, if sufficient energy is coupled to the ion, its oscillations exceed the bounds of the trap, i.e., it is ejected from the trap. Ions which are ejected from the ion trap are detected by electron multiplier 90 or an equivalent detector. Alternatively, the technique of mass instability scanning (described above in connection with the '884 patent) may be used to determine the contents of the ion trap, or methods based on the simultaneous ejection of contents of the trap by the application of a supplemental field as in a time-of-flight technique may be used. It will be also recognized by those skilled in the art that in-trap detection methods, such as those described in Kelley, or involving measurement of induced currents may also be used for obtaining mass spectra of the contents of ion trap 10.

Supplemental waveform generator 100 is of the type which is capable of generating a broadband signal composed of a wide range of discrete frequency components. A broadband waveform created by generator 100 is applied to the end cap electrodes of the ion trap so as to simultaneously resonantly eject a broad range of ion masses from the trap. Supplemental waveform generator 100 may also be used to fragment parent ions in the trap by CID, as is well known in the art. A variety of methods for constructing broadband waveforms to resonate unwanted ions out of an ion trap are known in the art and need not be described in detail.

According to the present invention, the full mass range to be scanned is divided into a plurality of mass segments (S1, S2, S3, . . . ). Each segment is defined by a different mass range of ions that are to be stored and detected and, preferably, the segments collectively cover the entire mass spectrum capable of being stored in the ion trap under the predetermined trapping conditions. There are at least two and, preferably, more mass segments. In addition, preferably there is minimal overlap between the various segments. The trapping conditions are held constant during the ionization time, and from one mass segment to another. A broadband wave form is applied by supplemental waveform generator 100 to the electrodes to resonantly eject all ions that are outside the desired range of the particular mass segment to be stored, thereby selectively trapping the ions in the mass range of interest. Each segment is therefore characterized by use of identical quadrupole trapping fields during ion formation, but different broadband wave forms that are applied during the ionization time.

In one embodiment of the present invention, the ionization parameters used for each segment are independently established and may be determined as follows. The total number of ions that were stored in the mass segment of interest during the previous analytical scan are used to determine the ionization parameters used during a subsequent scan. During the previous scan the ions in the mass segment were resonantly scanned from the trap to an external detector. The total ion current (TIC) produced during the prior scan of the segment is determined by the summation of all individual detected ion currents from the detector and is used to calculate the ionization parameters for the same segment during the next ionization and scan period.

Thus, for example, if the ionization time is the ionization parameter that is being controlled, each segment is characterized by an ionization time $T_{s1}$, $T_{s2}$, $T_{s3}$. . . The optimization of the ionization parameters of each segment is independent of the others; and the ion time of a particular segment $T_{si}$ is given by: $T_{si}=T_{si(p)}*X_{si}/I_{si(p)}$. Where $X_{si}$ is a user defined "target TIC" value, and $I_{si(p)}$ is the integrated TIC from the previous analytical scan of the same segment whose ionization time is $T_{si(p)}$. Hence, the target value $X_{si}$ is independently optimized for each segment.

According to the present invention, the space charge of each segment will be based on the last scan information for that segment (i.e., mass range) rather than an average value of the entire mass range, which is comprised of all segments. This makes it possible to place a low intensity mass in one segment and a high intensity mass in a different segment and have each segment optimized independently, as shown in FIG. 2, without the time penalty of using the prior art method of fixed field prescans.

The mass segments need not be equal in width, i.e., mass range. Preferably, the mass range of each segment is determined by the spectroscopist based on information about the sample, or based on the results of previous analysis of the sample.

Figure 2:
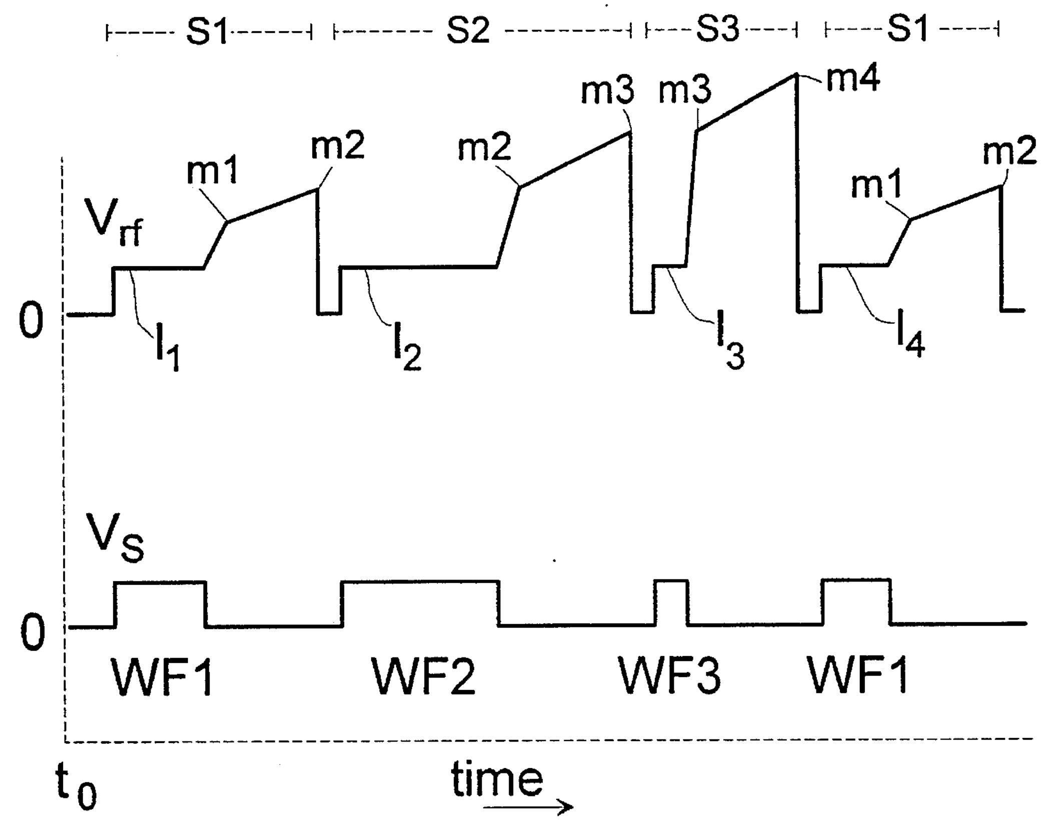
FIG. 2 is a timing diagram showing aspects of the method of a preferred embodiment of the present invention.

A timing diagram showing the application of the basic trapping voltage ($V_{rf}$) and the supplemental broadband voltage ($V_s$) is shown in FIG. 2. In the embodiment of FIG. 2, the mass range of the trap is divided into three mass segment, S1, S2 and S3. During S1 the trapping voltage is first raised from 0 to the baseline trapping conditions ($V_b$). At substantially the same time, the ionization beam is turned on during a period of time denoted as $I_1$ thereby forming ions within the ion trap. While the ion beam is on, a supplemental broadband waveform WF1 is applied to the trap to resonantly excite all unwanted ions from the ion trap as they are formed. Since S1 only includes low mass ions in the range m1–m2, WF1 is constructed to eliminate all masses higher than m2; (it is noted that all ions having a mass less than m1 are not stably trapped and thus no steps need be taken to eliminate them from the ion trap). At the conclusion of $I_1$, both the ion beam and WF1 are turned off and the contents of the trap are scanned over a range including all masses between ml and m2. Referring to FIG. 2, it will be noted that at the conclusion of the ionization period, $V_{rf}$ is rapidly raised to a voltage slightly less than that which will cause ejection of ml, and then slowly scanned over the mass range up until the mass m2 is ejected. Preferably, resonance ejection scanning is used for the mass analysis. To perform a resonance ejection scan, a fixed frequency supplemental voltage (not shown in FIG. 2) is applied to the ion trap when $V_{rf}$ is raised, and is turned off when the scan is complete. Thereafter, $V_{rf}$ is reduced to zero for a short period of time before commencing the second mass segment S2. Zeroing $V_{rf}$ for a short period of time clears the ion trap of all ions.

As shown, a similar procedure is performed in respect to S2 to cover the masses spanning the range of m2–m3. Some small overlap of the mass ranges may be permissible such that, for example, S1 and S2 both include the mass m2. It will be noted from FIG. 2 that the ionization period $I_2$ is longer than the period used during the first scan $I_1$. The length of the ionization period, or other ionization parameter, used during the scan of one segment need not be the same as that used during any other segment. Preferably, the period $I_2$ is based on the results of the previous scan of S2. WF2 is similar to WF1, however it is constructed to resonantly eject from the ion trap all masses other than those in the range m2–m3. (I.e., WF2 will cause ejection of masses less than m2 or more than m3.) Thus, WF2 will eject masses that are both higher than and lower than those in the mass segment S2. In will also be noted from FIG. 2 that after the ionization period is over and WF2 is turned off, $V_{rf}$ is rapidly raised to begin a scan of the trap covering the range m2–m3.

Again, a similar procedure is used in respect to S3 to cover the masses spanning the range m3–m4. In the example shown, the ionization period ($I_3$) used during segment S3 is relatively short. WF3 is constructed to resonantly eject all masses lower than m3 so that only masses in the range m3–m4 remain in the ion trap at the completion of the ionization period. In theory, when using only an AC trapping voltage, there is no upper mass limit to the ions that will be trapped. As a practical matter, however, the trapping efficiency of an ion trap decreases as the mass increases, so that above a certain point the number of high mass ions in the trap is so small as to be unimportant. Thus, ion traps are normally operated as though there is an upper mass limit; (in this example m4). To the extent high mass ions above m4 are present in the ion trap, their population is so small that they contribute only an insignificant amount to the total space charge in the ion trap.

Figure 3:
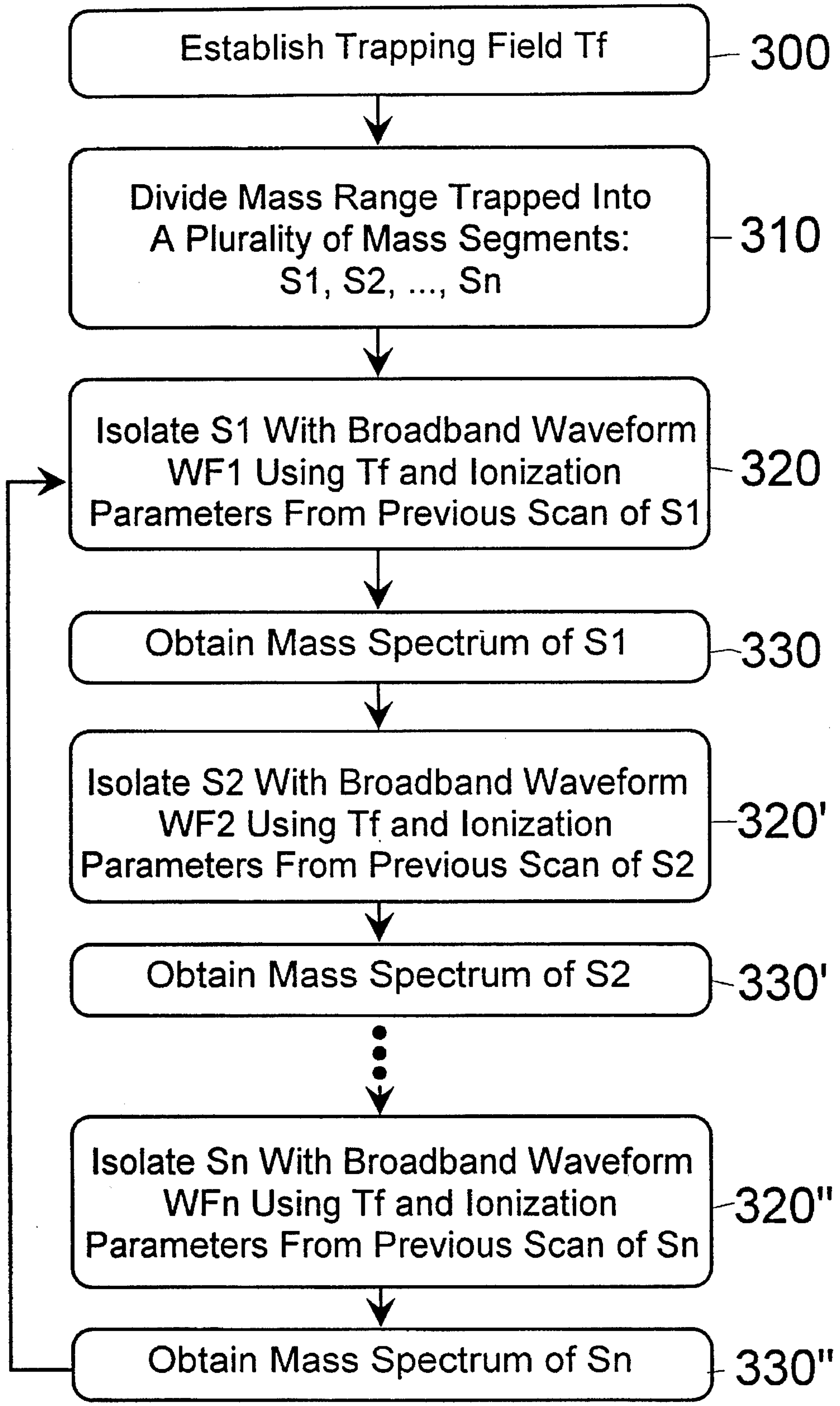
FIG. 3 is a flow chart showing the steps of the method of the present invention.

An exemplary flow chart depicting a preferred embodiment of the method of the present invention is shown in FIG. 3. As noted, the preferred method of the present invention is intended for use with a repetitive sampling regime and, thus, FIG. 3 shows a loop consisting of steps 320–330" which are repeated over and over again. Prior to beginning the sampling regime, a basic trapping field configuration Tf is established, at step 300. The basic trapping field is used throughout the experiment whenever ions are introduced into the trap. Tf determines the range of masses that will be trapped. In one embodiment, Tf is determined by the dimensions of the ion trap and the magnitude and frequency of the AC trapping voltage V. Tf can either be set as an instrument default or be entered by the spectroscopist. As described above, any masses below the selected range will not be stable within the trap and will leave. The upper end of the trapping range is less definite and is based on the practical inability of an ion trap to effectively trap large numbers of high mass ions.

Next, at step 310, the mass range is divided into a plurality of contiguous mass segments which are independently analyzed. Again, the mass segments used may either be set in accordance with an instrument default, or may be entered by the spectroscopist. In dividing the overall mass range into segments, consideration is, preferably, given to the relative concentrations of ions of interest. For example, an ion expected to be present in high concentrations may be placed in one mass segment, while an ion expected to be present in low concentrations in another mass segment so that the space charge of the high concentration ion does not interfere with the analysis of the low concentration ion. Likewise, an ion species that is highly reactive may be placed in a different mass spectrum than the other species that it is likely to react with.

Each segment is then consecutively scanned in a two-step procedure: steps 320, 330; 320', 330', . . . , 320", 330". The two-step procedure involves first isolating the particular segment using trapping conditions Tf and a broadband waveform WFn to resonantly eject unwanted ions (i.e., ions outside of Sn), and then obtaining a mass spectrum of the contents of the ion trap. After all the mass segments have been analyzed in this manner, the process is repeated. As shown, to optimize the number of sample ions in the trap, the ionization parameters used during the introduction and isolation of a particular mass segment are derived from the previous mass scan of the same segment. Of course, as to the very first scan of a particular segment there will be no prior scan to use to adjust the ionization parameters. In such instance, default ionization parameters stored in the instrument or ionization parameters entered by the spectroscopist may be used.

In an alternate embodiment of the method of the present invention, a two-step procedure may be used to eliminate unwanted ions from a given mass segment. Instead of using a single broadband waveform to eject both higher and lower mass ions from the ion trap, i.e., ions having masses above and below the masses within the particular mass segment of interest, two separate broadband waveforms may be used. The first broadband supplemental waveform, tailored to eject lower mass ions from the trap, is applied during the ionization period. The second supplemental broadband waveform is applied after ionization and is designed to eject higher mass ions from the ion trap. Each of the supplemental waveforms may have gaps between the frequency components, in which case the basic trapping voltage may be oscillated over a narrow range to effectively sweep the resonant frequencies of the ions, thereby assuring that all unwanted ions will come into resonance with at least one of the frequency components of the supplemental waveform.

While the foregoing description of preferred embodiments was based on the use of scanning the trap and detecting ions using an external detector, those skilled in the art will appreciate that other detection techniques may be used in connection with the present invention. For example, image current detection of the ions may be used in place of ejection outside of the trap, for the scanning of the ion spectrum. The image current signal could be integrated to determine the amount of charge in the trap. Likewise, rather than scanning the trap, the ions could be simultaneously ejected out of the trap to an external detector by applying a DC voltage to one of the end caps for a short period of time, or simply setting the RF trapping voltage to zero for that same time period. Simultaneous ejection may be used in conjunction with a time-of-flight technique.

Some of the advantages of the invention over the prior art are: (1) the determination of a mass spectrum of a sample by analyzing the spectrum in segments; (2) in concert with the segmentation of the mass range to be analyzed, selectively storing only the range of ions that are to be scanned in the particular segment of interest; (3) adjusting and optimizing the space charge level of the ions only in the segment of interest by adjusting the ionization parameters based on the previous scan of the ions in the segment of interest; (4) changing the mass ranges of the segments and optimizing target values of each segment as a function of time during a chromatographic analysis so as to tailor the specific space charge optimization of each segment to a specific compound in a chromatographic analysis; and (5) the elimination of the need for a fixed field prescan to estimate the space charge level that is stored.

While the present invention has been described in connection with the preferred embodiments thereof, those skilled in the art will recognize that other variations and equivalents to the subject matter described. Therefore, it is intended that the scope of the invention be limited only by the appended claims.

What is claimed is:

1. A method of using a quadrupole ion trap mass spectrometer to detect the presence of any ions within a range of interest comprising the steps of:

(a) establishing a trapping field within the ion trap such that ions in said range of interest are stably held within the ion trap;

(b) introducing sample ions into the ion trap;

(c) isolating ions within a first mass range within said ion trap, said first mass range containing masses fewer than said range of interest;

(d) detecting the masses stored within the ion trap within said first mass range;

(e) substantially immediately thereafter introducing additional sample ions into the ion trap;

(f) isolating ions within a second mass range within said ion trap, said second mass range covering a range of masses substantially different than said first mass range; and, (g) detecting the masses stored within said ion trap within said second mass range, such that a mass spectrum of said first and second mass ranges is obtained.

2. The method of claim 1 wherein the trapping field parameters are substantially the same during each ion isolation step.

3. The method of claim 1 wherein the ionization parameters used in each step of introducing sample ions into the ion trap are independently determined based on the expected ion population within the mass range that is isolated within the ion trap.

4. The method of claim 3 wherein the ionization parameters are adjusted based on the prior analytical scan of the same mass range.

5. A method of using a quadrupole ion trap mass spectrometer comprising the steps of:

(a) establishing an initial trapping field in said ion trap capable of stably trapping ions having masses in a selected range within the ion trap;

(b) dividing said selected range of masses into a plurality of substantially contiguous mass segments;

(c) sequentially isolating the masses within each mass segment in said ion trap using broadband supplemental waveforms, each said supplemental broadband waveform having frequency components that will cause ions outside of a selected mass segment to be resonantly ejected from the ion trap;

(d) obtaining a mass spectrum of each mass segment prior to isolating the next mass segment.

6. The method of claim 5 wherein each mass segment is isolated using the same trapping field conditions.

7. The method of claim 5 wherein the mass segments cover mass ranges of different size.

8. The method of claim 5 wherein said mass spectra are obtained using resonance ejection scanning.

9. The method of claim 5 wherein said mass spectra are obtained using mass instability scanning.

10. The method of claim 5 wherein said mass spectra are obtained using internal detection.

11. The method of claim 10 wherein said mass spectra are obtained by measuring induced currents.

12. The method of claim 5 wherein said mass spectra are obtained by simultaneously ejecting from the ion trap all ions within a particular mass segment and detecting the time of flight of the ejected ions.

13. The method of claim 5 wherein the ionization parameters used during the ionization of each mass segment are separately determined.

14. The method of claim 13 wherein the ionization parameters used for a particular mass segment are based on the previous scan of the same mass segment.

15. The method of claim 5 wherein the mass range of the mass segments is chosen such that at least one relatively low concentration sample ion of interest is within one segment and another relatively high concentration ion is in a different segment, such that the space charge from said high concentration ion does not interfere with the analysis of said low concentration ion of interest.

16. A method of using a quadrupole ion trap mass spectrometer comprising the steps of:

(a) establishing a set of predetermined trapping conditions that will efficiently trap ions having masses spanning a first range of masses;

(b) dividing said first range of masses into a plurality of contiguous mass segments;

(c) consecutively isolating and obtaining mass spectra of each of the mass segments;

(d) integrating the mass spectra of each mass segment to determine the total ion population within that mass segment; and, (e) repeating step (c) using the integrated total ion population of each mass segment to control an ionization parameter used in connection with said mass segment.

17. The method of claim 16 wherein the step of isolating each mass segment is performed using said predetermined trapping conditions.

18. The method of claim 17 wherein the step of isolating each mass segment comprises the step of applying a broadband supplemental voltage to the ion trap while ions are being formed within the ion trap, said supplemental broadband voltage having the characteristic that it will resonantly eject all masses within said mass range out of the ion trap other than those within the mass segment being isolated.

* * * * *